Figure 1:
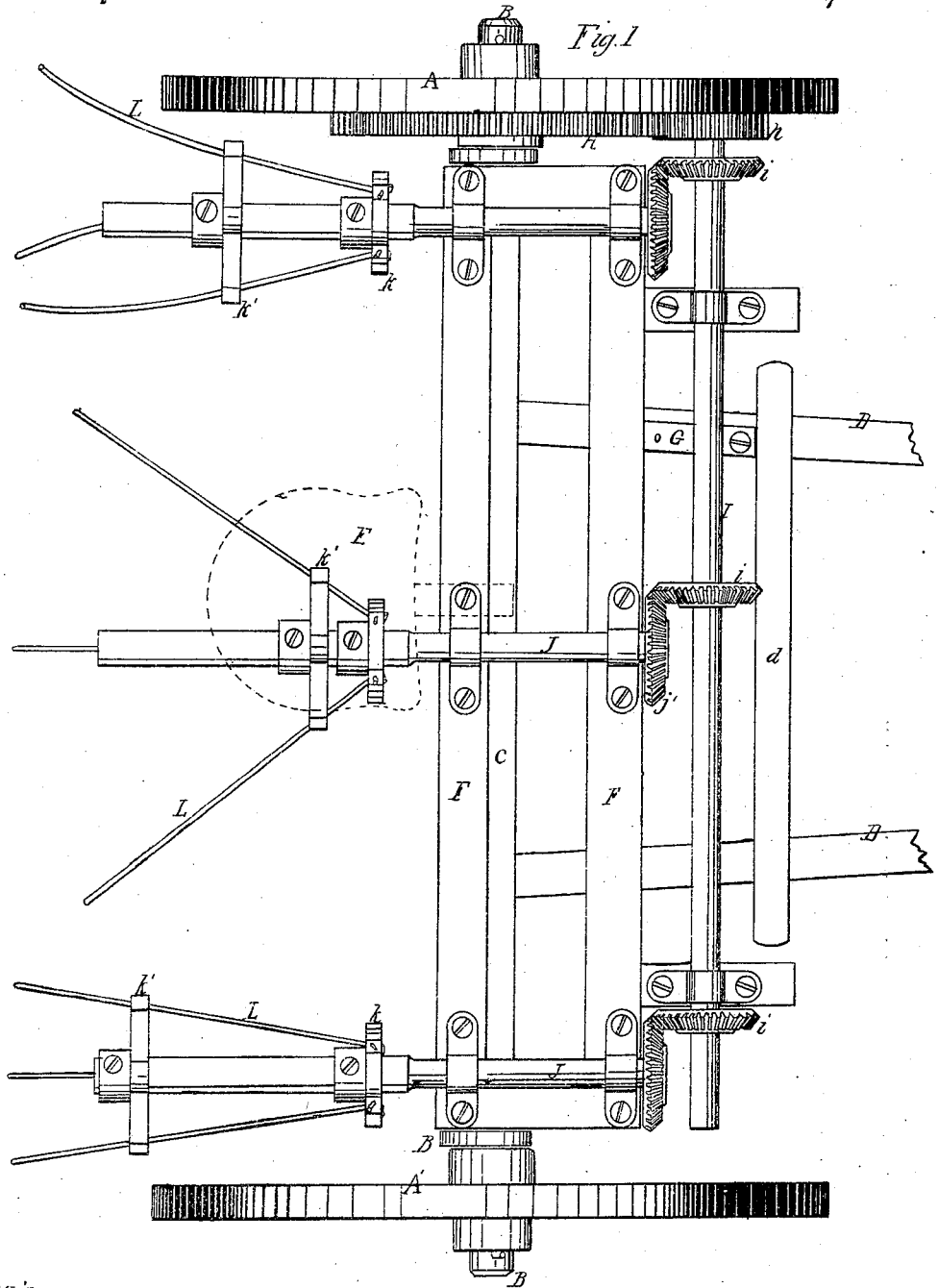

Sheet 2 - 2 Sheets.

J. C. Stoddard.
Hay Tedder.

Nº 92122.    Patented Jun. 29. 1869

Witnesses:

Inventor:
J. C. Stoddard
by his Atty
Wm. D. Baldwin

United States Patent Office.

JOSHUA C. STODDARD, OF WORCESTER, MASSACHUSETTS.

Letters Patent No. 92,122, dated June 29, 1869.

IMPROVEMENT IN HAY-SPREADERS.

The Schedule referred to in these Letters Patent and making part of the same.

*To all whom it may concern:*

Be it known that I, JOSHUA C. STODDARD, of the city and county of Worcester, in the State of Massachusetts, have invented certain new and useful Improvements in Hay-Spreaders, of which the following is a full, clear, and exact description.

The hay-spreaders heretofore used consist mainly of a series of rakes rotating on an axis parallel with the main axle of the machine, and moving the cut crop in lines parallel with the path of the machine.

The object of the first part of my invention is to turn the crop in a direction transverse to the path of the machine; and The improvements herein claimed consist—

First, in a novel method of combining, with a hay-spreader, a rake rotating on an axis transverse to the main axle of the machine.

The object of the next part of my invention is so to adjust the rake-teeth as to cause them to describe a larger or smaller circle; and The improvement consists—

Second, in a novel method of combining radially-adjustable rake-teeth, with a shaft rotating transversely to the main axle.

Third. The improvement further consists in a novel method of combining in a hay-spreader, independently-adjustable radially-pivoted rake-teeth, revolving on independent shafts, parallel to each other, whereby each set of teeth may describe a circle of a diameter different from the others if required.

The object of the next part of my invention is, to render the machine adjustable to suit horses of different heights; and The improvement consists—

Fourth, in a novel method of combining a draught-frame, vibrating on the main axle, and a gearing-frame, vibrating on the same axle, and adjustable relatively to the draught-frame, with rakes rotating on axes transverse to the main axle.

Fifth. The improvement further consists in a novel method of combining, in a hay-spreader, two wheels mounted on crank-axles, and a draught-frame connecting said axles below the axis of the wheels, with an adjustable-gear frame pivoted in the line of the axles of the wheels above the draught-frame.

Sixth. The improvement further consists in a novel method of combining rakes rotating transversely to the main axle, and in rear thereof, with a countershaft in front of the main axle.

The accompanying drawings show all the improvements herein claimed, embodied in one machine. It is obvious, however, that some of my improvements might be used without the others, and might also be adapted to machines varying in their construction from that shown in the drawings.

Figure 1 represents a plan or top view of my improved machine.

Figure 2:
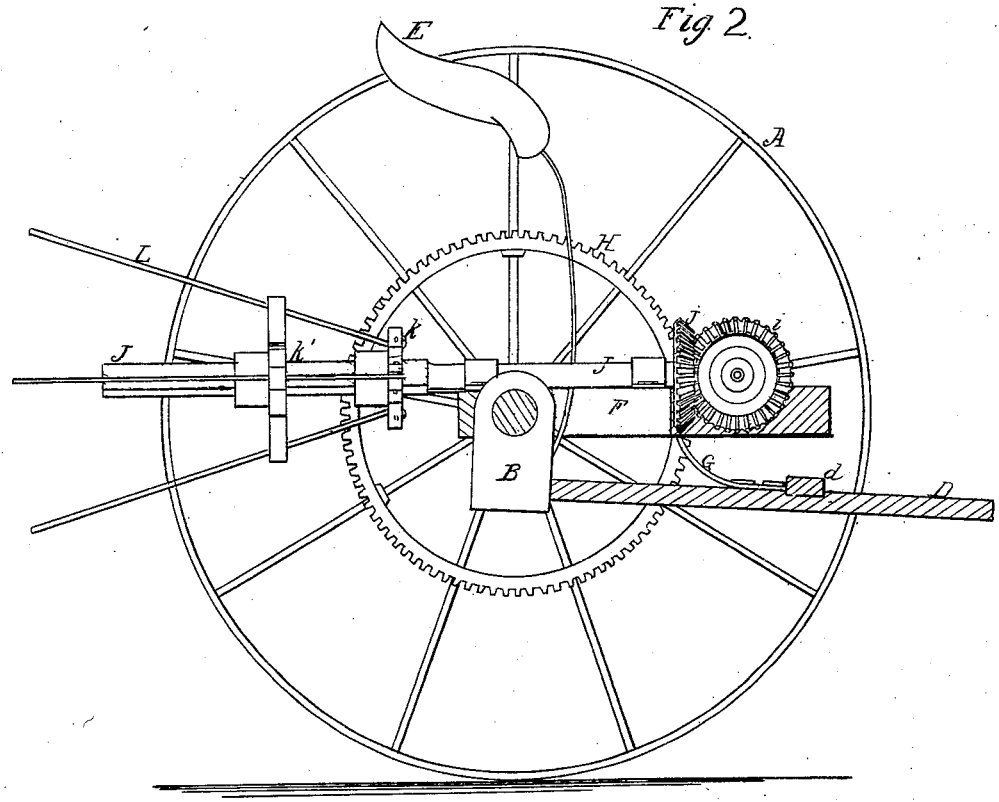

Figure 2, a view, in elevation, of the same as seen from one side, with the near wheel removed, and the frame partly in section.

Figure 3:
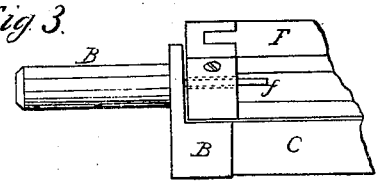

Figure 3, a front view of one of the crank-axles, and a portion of the draught-frame and gearing-frame, showing their mode of construction.

In this instance, two wheels A A$^1$, are shown, as turning loosely on crank-axles B, secured upon a transverse beam C, from which thills D project.

These thills are connected by a cross-bar, *d*, and, with the beam C, constitute what I term a draught-frame.

The beam C, it will be observed, is below the line of the axles of the wheels. A seat, E, for the driver, is mounted on the beam C.

A gearing-frame, F, is connected with the axles by pivot-pins *f*, near its rear end. These pins, it will be observed, are in the line of the axis of the wheels A A$^1$. The thills and gear-frame are thus free to vibrate or rock on the axles, and can also be adjusted, relatively to each other, by means of a spring-catch, G, (or other equivalent means,) which holds the two frames together.

In this instance, a spur-wheel, H, drives a corresponding pinion, *h*, on a countershaft, I, mounted in proper bearings on the frame F.

Bevel pinions *i*, on this shaft, gear into corresponding pinions *j*, on shafts J, (mounted in proper bearings on the gear-frame,) transverse to the main axle.

The rear portions of these shafts are squared to receive flanged collars *k k*$^1$, which can be moved toward or from each other, and held in any desired position by set-screws.

Rake-teeth L, are pivoted in the collars *k*, so as to be free to play radially, and pass through eyes or loops in the collars *k*$^1$, so that as the collars approach each other, the rear ends of the rake-teeth diverge, and *vice versa.*

The teeth may be made either straight or curved, as desired.

In fig. 1, the rakes are shown as adjusted to describe circles of different diameters, to illustrate their working more clearly.

It is obvious that the rakes might be driven from either or both wheels, that the gearing might be changed, and other details of construction varied, without departing from the spirit of my invention.

The rakes might be so geared as to throw the crop to the centre from both sides, or *vice versa*, instead of all rotating in one direction, as in the drawing.

The operation of the machine is so obvious as to require no description other than that already given.

What I claim as my invention, and desire to secure by Letters Patent, is—

1. The combination, with a hay-spreader, of a rake, rotating on an axis transverse to the main axle, the combination being and operating substantially as set forth.

2. The combination, substantially as set forth, in a hay-spreader, of a shaft rotating transversely to the main axle, with teeth radially adjustable relatively to their axis of rotation.

3. The combination, in a hay-spreader, of independently-adjustable radial rake-teeth, with independent parallel shafts transverse to the main axle, the combination being and operating substantially as set forth.

4. The combination, substantially as set forth, in a hay-spreader, of a draught-frame vibrating on the main axle, and a gearing-frame vibrating on the same axle, and adjustable relatively to the draught-frame, with rakes rotating on shafts transverse to the main axle.

5. The combination, substantially as set forth, in a hay-spreader, of two wheels mounted on crank-axles, and a draught-frame connecting said axles below the axis of the wheels, with an adjustable gear-frame, pivoted in the line of the axles of the wheels above the draught-frame.

6. The combination, substantially as set forth, in a hay-spreader, of rakes rotating transversely to the main axle, in rear thereof, with a countershaft in front of said axle.

In testimony whereof, I have hereunto subscribed my name.

J. C. STODDARD.

Witnesses:
GEO. SWAN,
THOMAS MCGRATH.